(12) United States Patent
Carbonell et al.

(10) Patent No.: US 11,622,069 B2
(45) Date of Patent: *Apr. 4, 2023

(54) OBTAINING CAMERA DEVICE IMAGE DATA REPRESENTING AN EVENT

(71) Applicant: International Business Machines Corporation, Armonk, NY (US)

(72) Inventors: Lee A. Carbonell, Flower Mound, TX (US); Tsz Shing Cheng, Grand Prairie, TX (US); Jeffrey Lynn Edgington, Fort Worth, TX (US); Pandian Mariadoss, Allen, TX (US)

(73) Assignee: International Business Machines Corporation, Armonk, NY (US)

( * ) Notice: Subject to any disclaimer, the term of this patent is extended or adjusted under 35 U.S.C. 154(b) by 28 days.

This patent is subject to a terminal disclaimer.

(21) Appl. No.: 16/789,882

(22) Filed: Feb. 13, 2020

(65) Prior Publication Data

US 2020/0186700 A1 Jun. 11, 2020

Related U.S. Application Data

(63) Continuation of application No. 15/907,405, filed on Feb. 28, 2018, now Pat. No. 10,602,045, which is a
(Continued)

(51) Int. Cl.
| | |
|---|---|
| *H04N 5/232* | (2006.01) |
| *H04N 5/247* | (2006.01) |
| *H04N 5/77* | (2006.01) |
| *G06V 10/25* | (2022.01) |
| *G06V 20/10* | (2022.01) |
| *G06V 20/40* | (2022.01) |

(Continued)

(52) U.S. Cl.
CPC .......... *H04N 5/23206* (2013.01); *G06T 7/11* (2017.01); *G06T 7/13* (2017.01); *G06T 7/292* (2017.01); *G06T 7/33* (2017.01); *G06V 10/25* (2022.01); *G06V 20/10* (2022.01); *G06V 20/41* (2022.01); *H04N 5/232945* (2018.08); *H04N 5/247* (2013.01); *H04N 5/77* (2013.01)

(58) Field of Classification Search
CPC ................ H04N 5/23206; H04N 5/77; H04N 5/232945; H04N 5/247; G06K 9/00664; G06K 9/3233; G06K 9/00718; G06T 7/292; G06T 7/11; G06T 7/13; G06T 7/33; G06V 10/25; G06V 20/10; G06V 20/41

See application file for complete search history.

(56) References Cited

U.S. PATENT DOCUMENTS

| | | | |
|---|---|---|---|
| 7,734,246 | B2 | 6/2010 | Kummer |
| 8,483,654 | B2 | 7/2013 | Levinson et al. |

(Continued)

OTHER PUBLICATIONS

P. Mell, et al. "The NIST Definition of Cloud Computing", NIST Special Publication 800-145, Sep. 2011, Gaithersburg, MD.
(Continued)

*Primary Examiner* — Shahbaz Nazrul
(74) *Attorney, Agent, or Firm* — Aaron Pontikos; George S. Blasiak; Heslin Rothenberg Farley Mesiti P.C.

(57) ABSTRACT

Methods, computer program products, and systems are presented and can include for instance: determining a location of interest; and obtaining image data from one or more camera device about the location of interest.

25 Claims, 10 Drawing Sheets

Related U.S. Application Data continuation of application No. 15/227,535, filed on Aug. 3, 2016, now Pat. No. 9,955,061.

(51) Int. Cl.
  *G06T 7/13* (2017.01)
  *G06T 7/33* (2017.01)
  *G06T 7/292* (2017.01)
  *G06T 7/11* (2017.01)

(56) References Cited

U.S. PATENT DOCUMENTS

| | | | |
|---|---|---|---|
| 9,071,807 B2 | 6/2015 | Billau et al. | |
| 9,288,374 B1* | 3/2016 | Cooper | H04N 5/23225 |
| 9,509,900 B2 | 11/2016 | Jo | |
| 9,900,660 B2* | 2/2018 | McRae | H04N 21/4753 |
| 9,955,061 B2 | 4/2018 | Carbonell et al. | |
| 2003/0210329 A1 | 11/2003 | Agaard | |
| 2010/0149335 A1 | 6/2010 | Miller, II | |
| 2010/0245568 A1 | 9/2010 | Wike, Jr. | |
| 2011/0058034 A1 | 3/2011 | Grass | |
| 2011/0109742 A1 | 5/2011 | Laganiere | |
| 2013/0005294 A1 | 1/2013 | Levinson | |
| 2013/0073775 A1 | 3/2013 | Wade | |
| 2013/0128050 A1 | 5/2013 | Aghdasi | |
| 2013/0331128 A1* | 12/2013 | Qiu | G01S 5/0294 455/456.3 |
| 2014/0036090 A1 | 2/2014 | Black | |
| 2014/0067487 A1 | 3/2014 | Assunacao | |
| 2014/0258201 A1* | 9/2014 | Finlow-Bates | G06N 5/02 706/46 |
| 2014/0294361 A1 | 10/2014 | Acharya et al. | |
| 2015/0101134 A1 | 4/2015 | Manz | |
| 2015/0127486 A1 | 5/2015 | Advani et al. | |
| 2015/0201134 A1 | 7/2015 | Carr | |
| 2015/0381888 A1 | 12/2015 | Su | |
| 2016/0049014 A1* | 2/2016 | Wells | G07B 15/02 705/13 |
| 2017/0244930 A1* | 8/2017 | Faulkner | H04N 7/147 |
| 2018/0191944 A1 | 6/2018 | Carbonell et al. | |
| 2018/0249289 A1* | 8/2018 | Chatterjee | G06Q 20/322 |
| 2019/0110096 A1* | 4/2019 | Shaw | H04N 21/4223 |

OTHER PUBLICATIONS

McDuff et al_, "Crowdsourced Data Collection of Facial Responses", http://www.affectiva_com/wp-content/2014/09/Crowdsourced_Data_Collection_ofFacialExpressions.pdf, 8 pgs.

Boutsis et al., Towards Real-Time Emergency Response Using Crowdsourcing, Athens University of Economics and Business, Athens, Greece, http://acm_orgicitation.cfm?id=2674466, 4 pgs.

Elsami et al., "Dual Dynamic PTZ Tracking Using Cooperative Cameras", Intelligent Control and Automation, 2015, 6, 15-54, https://www_scirp.org/Joumal/PaperDownload.aspx?paperID=53319.

List of IBM Patents or Applications Treated as Related, Feb. 13, 2020, 2 pgs.

* cited by examiner

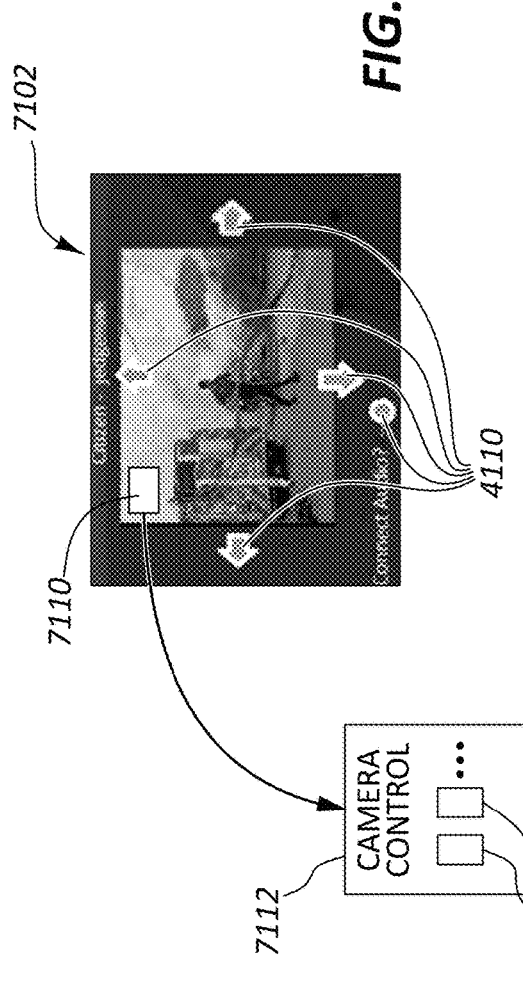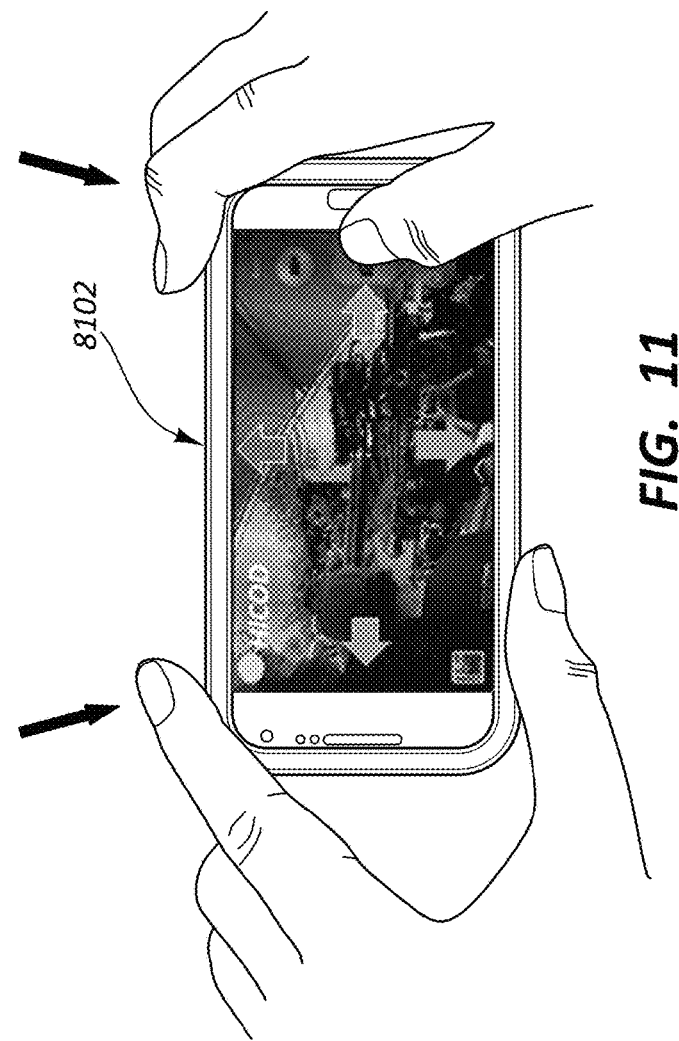

OBTAINING CAMERA DEVICE IMAGE DATA REPRESENTING AN EVENT

CROSS-REFERENCE TO RELATED APPLICATION

This application is a continuation of U.S. patent application Ser. No. 15/907,405, filed Feb. 28, 2018 entitled, "Obtaining Camera Device Image Data Representing an Event," which is incorporated by reference herein in its entirety, which is a continuation of U.S. patent application Ser. No. 15/227,535, filed Aug. 3, 2016 entitled, "Obtaining Camera Device Image Data Representing an Event," which is incorporated by reference herein in its entirety.

TECHNICAL FIELD

The present disclosure in the field of computer networks relates to obtaining of camera device image data.

BACKGROUND

The prior art describes methods for processing previously recorded image data obtained from a plurality of users. For example, the prior art describes a method for clustering images includes acquiring initial image data including a scene of interest. A 3D model is constructed of the scene of interest based on the acquired initial image data. Additional image data including the scene of interest is acquired. The additional image data is fitted to the 3D model. A line-of-sight of the additional image data is estimated based on the fitting to the 3D model. The additional image data is clustered according to the estimated line-of-3D model may be constructed from the initial image data using structure from motion (SfM) processing. The initial image data may include a plurality of still or video images of the scene of interest. The plurality of still or video images may be acquired by a plurality of different users. The additional image data may include a plurality of still or video images of the scene of interest. The plurality of still or video images may be acquired by a plurality of different users. The additional image data may be fit to the 3D model using structure for motion (SfM) processing. The estimating of the line-of-sight of the additional image data may be based on the fitting to the 3D model is performed by the SfM processing. Clustering the additional image data according to the estimated line-of-sight may include establishing a visual metric for content similarity, rating discrete images of the additional image data according to the established metric, and grouping the discrete images according to closeness of the ratings.

While various attempts to obtain and use crowdsourced image data have been made, proposals such as that described have involved previously recorded image data and scenes of interest occurring at time prior to the current time.

SUMMARY

The shortcomings of the prior art are overcome, and additional advantages are provided, through the provision, in one aspect, of a method. The method can include, for example: determining, by one or more processor, a location of interest; and obtaining, by one or more processor, image data from one or more camera device about the location of interest.

In one embodiment the location of interest can be the location of an event. The method can provide additional information about the event, such as image data representing an event. The event can be a live event.

In one embodiment, the location of interest can be a location of a live event and the obtaining can include obtaining for display crowdsourced image data from a plurality of camera devices, wherein crowdsourced image data includes image data representing the live event. In such embodiment, additional information about an event can be provided, such a crowdsourced image data from a plurality of users, each having the ability to provide image data from a different vantage point.

In one embodiment, the obtaining image data from one or more camera device about the location of interest can include establishing a geofence and determining devices within the geofence. A geofence can be established based on one or more criteria and/or one or more user input. In an embodiment establishing a geofence can provide a convenient way to determine camera devices about a location of interest from which image data may be obtained.

In one embodiment, obtaining of image data can include prioritizing views from camera devices of the one or more camera device from which image data can be obtained. Prioritizing camera device views can increase the usefulness of presented information presented to an operator of a management system by increasing attention to image data determined likely to include improved representation of a location of interest such as a location of a live event.

In one embodiment, the determining a location of interest can include examining information of an external system, such as an emergency center system. Examining information of an external system for determining a location of interest leverages use of the external system, and augments performance of the current system and the external system.

In one embodiment, the method can include sending one or more prompt message to a camera device of the one or more camera device for prompting of a user of the camera device to operate the camera device. The sending the one or more prompt message can be performed while live image data from the camera device is being displayed. Embodiments where one or more prompt message is sent can improve image data obtained by improving the likelihood that improved image data is representative of a location of interest such as a location of a live event.

In another aspect, a computer program product can be provided. The computer program product can include a computer readable storage medium readable by one or more processing unit and storing instructions for execution by one or more processor for performing a method. The method can include, for example: determining a location of interest; and obtaining image data from one or more camera device about the location of interest.

In a further aspect, a system can be provided. The system can include, for example a memory. In addition, the system can include one or more processor in communication with the memory. Further, the system can include program instructions executable by the one or more processor via the memory to perform a method. The method can include, for example: determining a location of interest; and obtaining image data from one or more camera device about the location of interest.

The shortcomings of the prior art are overcome, and additional advantages are provided, through the provision, in one aspect, of a method. The method can include, for example: determining, by one or more processor, a location of interest; and obtaining, by one or more processor, image data from one or more camera device about the location of interest, wherein the obtaining includes obtaining for display crowdsourced image data from a plurality of camera devices.

In another aspect, a computer program product can be provided. The computer program product can include a computer readable storage medium readable by one or more processing unit and storing instructions for execution by one or more processor for performing a method. The method can include, for example: determining a location of interest wherein the location of interest is a location of a live event; and obtaining image data from one or more camera device about the location of interest, wherein the obtaining includes obtaining for display crowdsourced image data from a plurality of camera devices.

In a further aspect, a system can be provided. The system can include, for example a memory. In addition, the system can include one or more processor in communication with the memory. Further, the system can include program instructions executable by the one or more processor via the memory to perform a method. The method can include, for example: determining a location of interest, wherein the location of interest is a location of a live event; and obtaining image data from one or more camera device within about the location of interest, wherein the obtaining includes obtaining for display crowdsourced image data from a plurality of camera devices.

Additional features and advantages are realized through the techniques set forth herein. Other embodiments and aspects are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 10 illustrates a manager system user interface in accordance with an embodiment as set forth herein;

FIG. 11 illustrates a manager system user interface in accordance with an embodiment as set forth herein.

DETAILED DESCRIPTION

Figure 1:
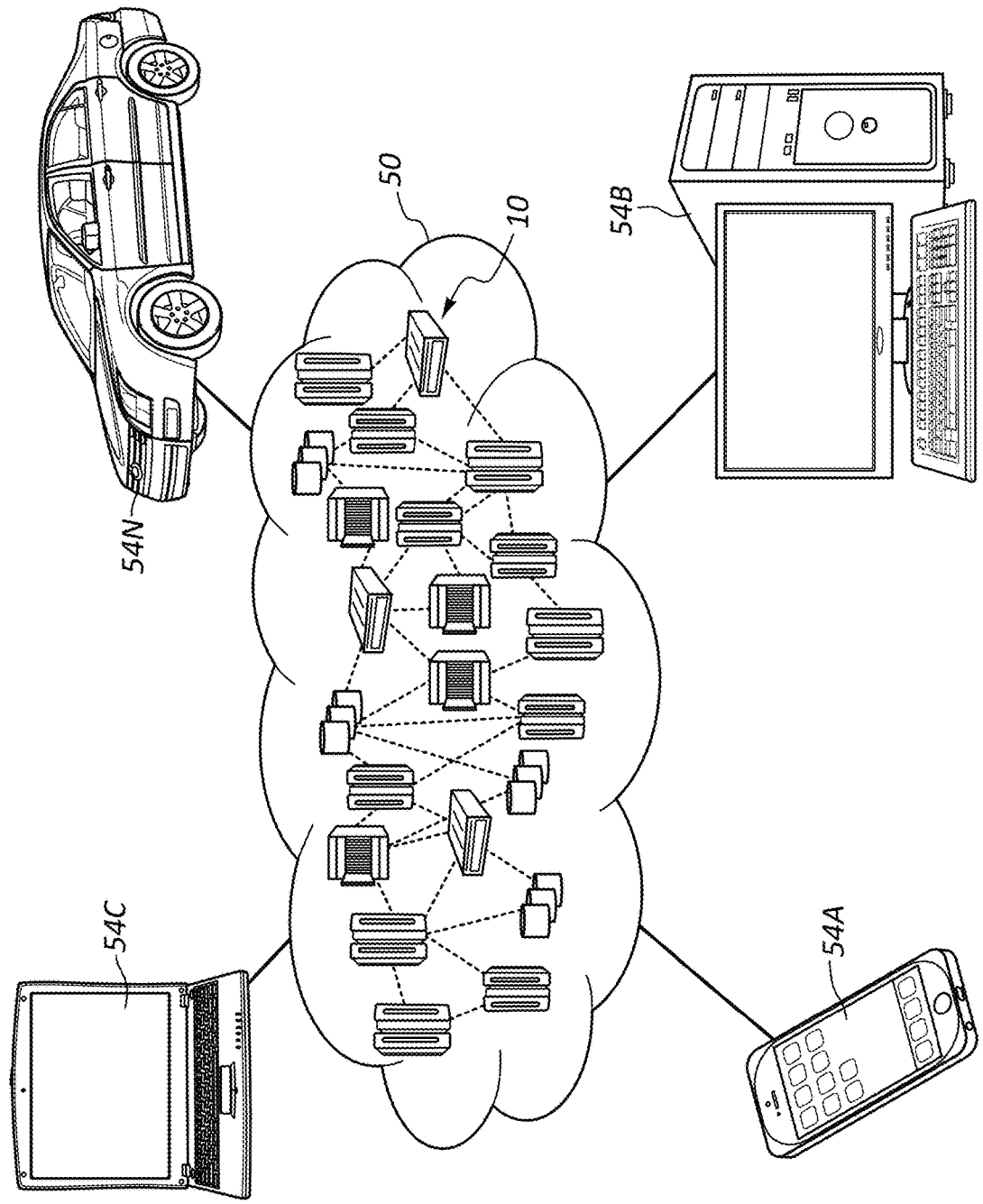
FIG. 1 depicts a cloud computing environment according to an embodiment as set forth herein.

Aspects of the present disclosure and certain features, advantages, and details thereof, are explained more fully below with reference to the non-limiting examples illustrated in the accompanying drawings. Descriptions of well-known materials, processing techniques, etc., are omitted so as not to unnecessarily obscure the disclosure in detail. It should be understood, however, that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure.

Advantageously, the techniques disclosed herein allow for determining a location of interest; and obtaining, by one or more processor, image data from one or more camera device about the location of interest.

Embodiments herein are directed to improvements in computer technology, such as an improved computer network facilitating obtaining of image data from one or more camera device. In some embodiment, obtained image data can include crowdsourced image data from a plurality of camera devices. In some embodiments, views from various camera devices can be prioritized for enhanced presentment of information. In some embodiments, prompt messages can be sent to one or more camera device prompting a user of a camera device to operate a camera device to operate the camera device for improved representing of an event. In some embodiments, prompt messages can be automatically determined based on a location of an event and a camera device.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
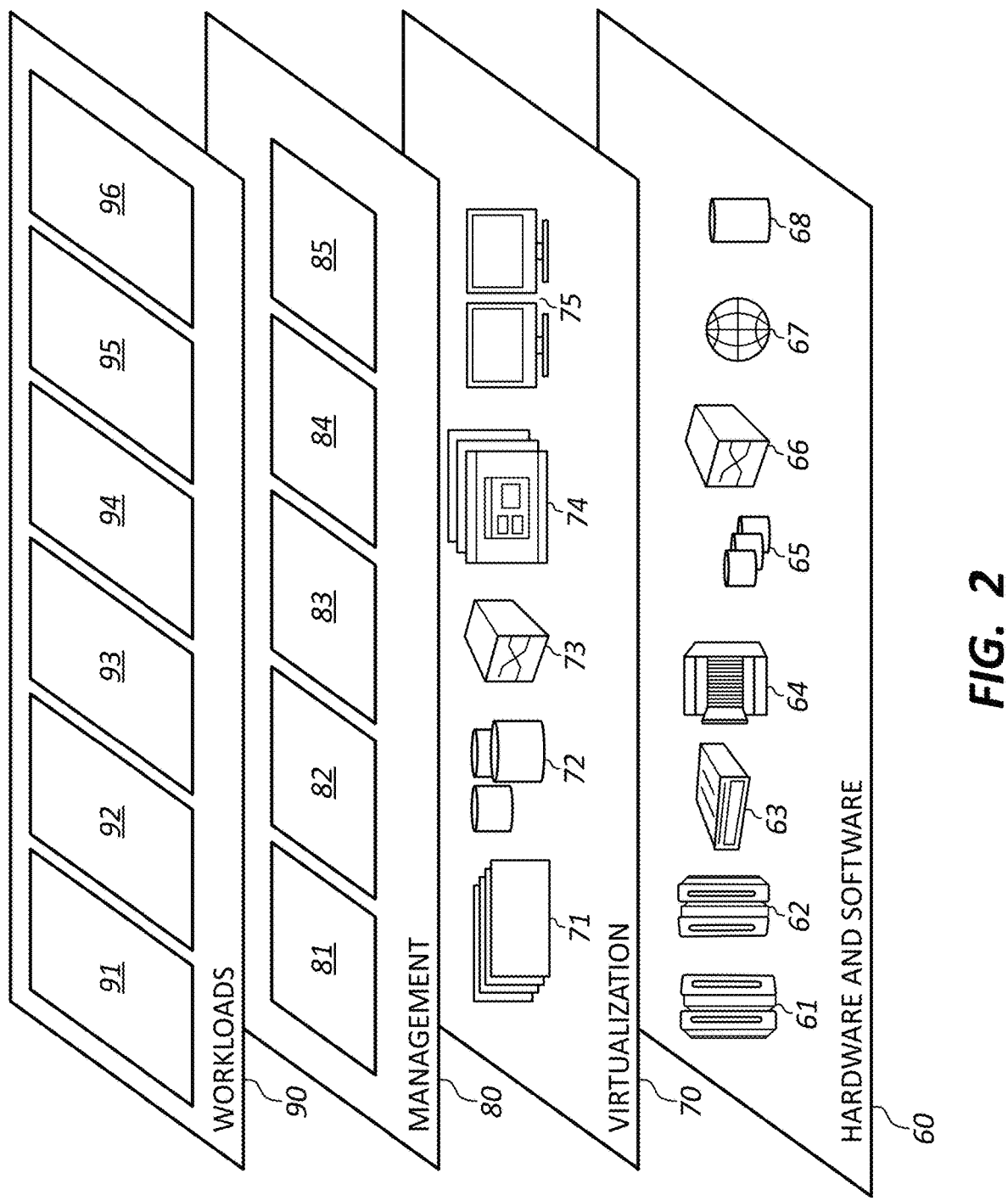
FIG. 2 depicts abstraction model layers according to an embodiment as set forth herein.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and image data obtaining 96.

Figure 3:
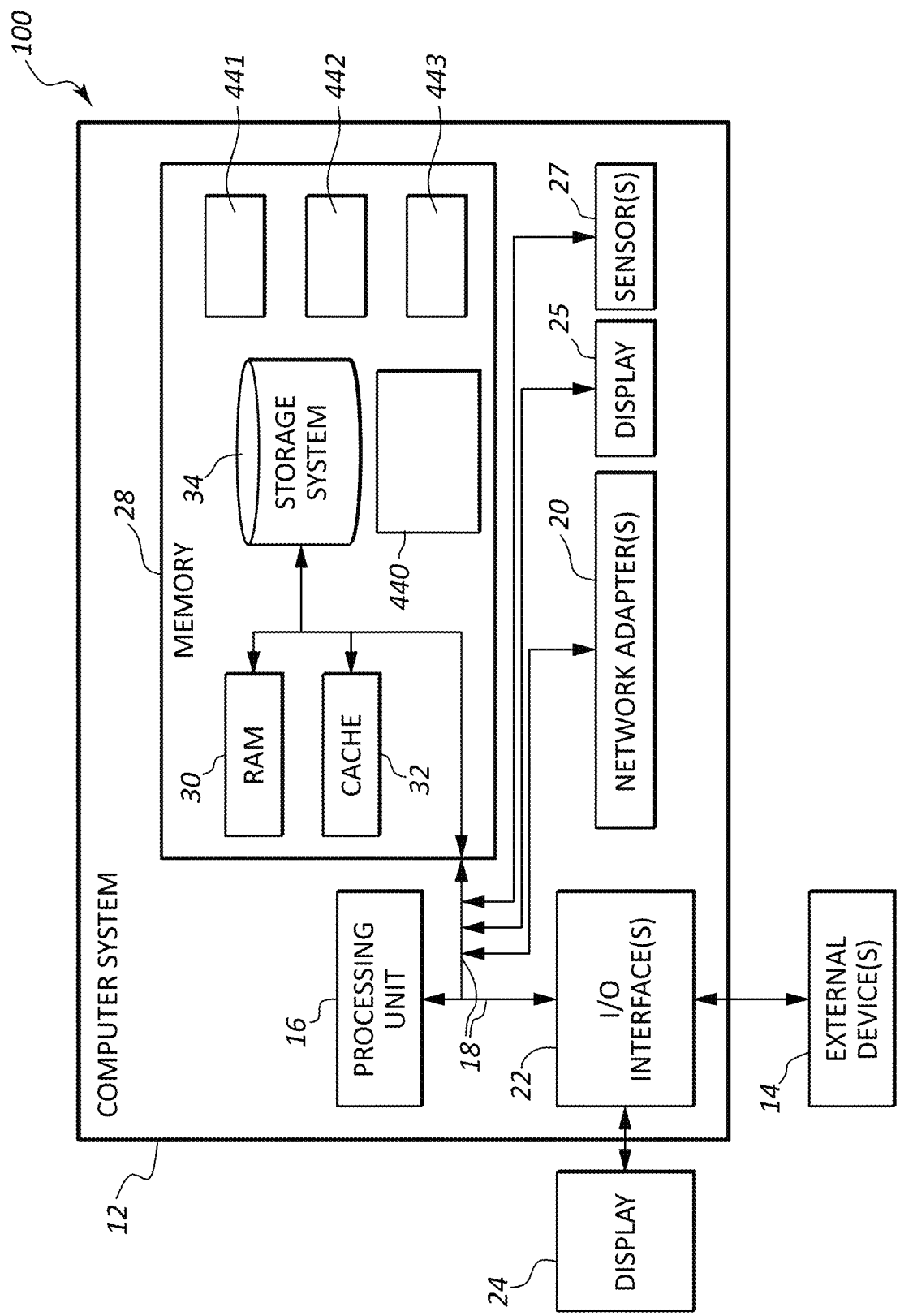
FIG. 3 depicts a hardware overview of a computing node, in accordance with an embodiment as set forth herein.

Referring now to FIG. 3, FIG. 3 depicts a hardware overview of a computing node 100, in accordance with an embodiment set forth herein. Computing node 100 is only one example of a suitable computing node and is not intended to suggest any limitation as to the scope of use or functionality of embodiments of the invention described herein. Regardless, computing node 100 is capable of being implemented and/or performing any of the functionality set forth hereinabove.

In one embodiment, computing node 100 can be provided as a cloud computing node 10 of a cloud computing environment 50 as set forth in reference to FIG. 1. In one embodiment, computing node 100 can be provided as a computing node of a computing environment other than a cloud computing environment.

In computing node 100 there can be provided a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices. Computer system 12 may be practiced in a non-distributed and/or non-cloud environment.

As shown in FIG. 3, computer system 12 in computing node 100 is shown in the form of a general-purpose computing device. The components of computer system 12 may include, but are not limited to, one or more processor 16, a system memory 28, and a bus 18 that couples various system components including system memory 28 to one or more processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one or more program (e.g., one or more program 440 and/or one or more program 441, 442, 443 as set forth herein) configured to carry out the functions of embodiments of the invention.

One or more program 440 having a set (at least one) of program modules, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. In place of or in addition to one or more program 440 memory 28 can store one or more additional one or more program, e.g., one or more program 441, 442, 443.

Computer system 12 may also communicate with one or more external devices 14 such as a keyboard, a pointing device, a display 24, etc. that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via one or more network adapter 20. One or more network adapter 20 can include at least one wireless communication network adapter. As depicted, network adapter 20 communicates with the other components of computer system 12 via bus 18. It should be understood that although not shown, other hardware and/or software components could be used in conjunction with computer system 12. Examples include, but are not limited to: microcode, device vehicle operators, redundant processing units, external disk drive arrays, RAID systems, tape drives, and data archival storage systems, etc. In addition to or in place of having external devices 14 and display 24, which can be configured to provide user interface functionality, computing node 100 in one embodiment can include display 25 connected to bus 18. In one embodiment, display 25 can be configured as a touch screen display and can be configured to provide user interface functionality. Computer system 12 in one embodiment can also include one or more sensor device 27 connected to bus 18. One or more sensor device 27 can alternatively be connected through I/O interface(s) 22. One or more sensor device 27 can include a camera, e.g. a pixel array camera. A pixel array camera can be e.g. a color CMOS pixel array camera. One or more sensor device 27 can include a Global Positioning Sensor (GPS) device in one embodiment and can be configured to provide a location of computing node 100.

A representative one or more program of one or more program 440, 441, 442, 443 can have a set (at least one) of program modules, and may be stored in memory 28 by way of example, and not limitation, as well as an operating system, one or more application programs, other program modules, and program data. Each of the operating system, one or more application programs, other program modules, program data, and one or more program, or some combination thereof, may include an implementation of a networking environment. One or more program 440 (and optionally at least one program of one or more program 441, 442, 443) can generally carry out the functions and/or methodologies of embodiments of the invention as described herein. One or more program 440 (and optionally at least one program of one or more program 441, 442, 443) can include computer readable program instructions as are set forth herein that can be stored in a computer readable storage medium within a respective computing/processing device. In one embodiment a computer readable storage medium as set forth herein can be included in memory 28 as set forth in FIG. 3.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures for example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
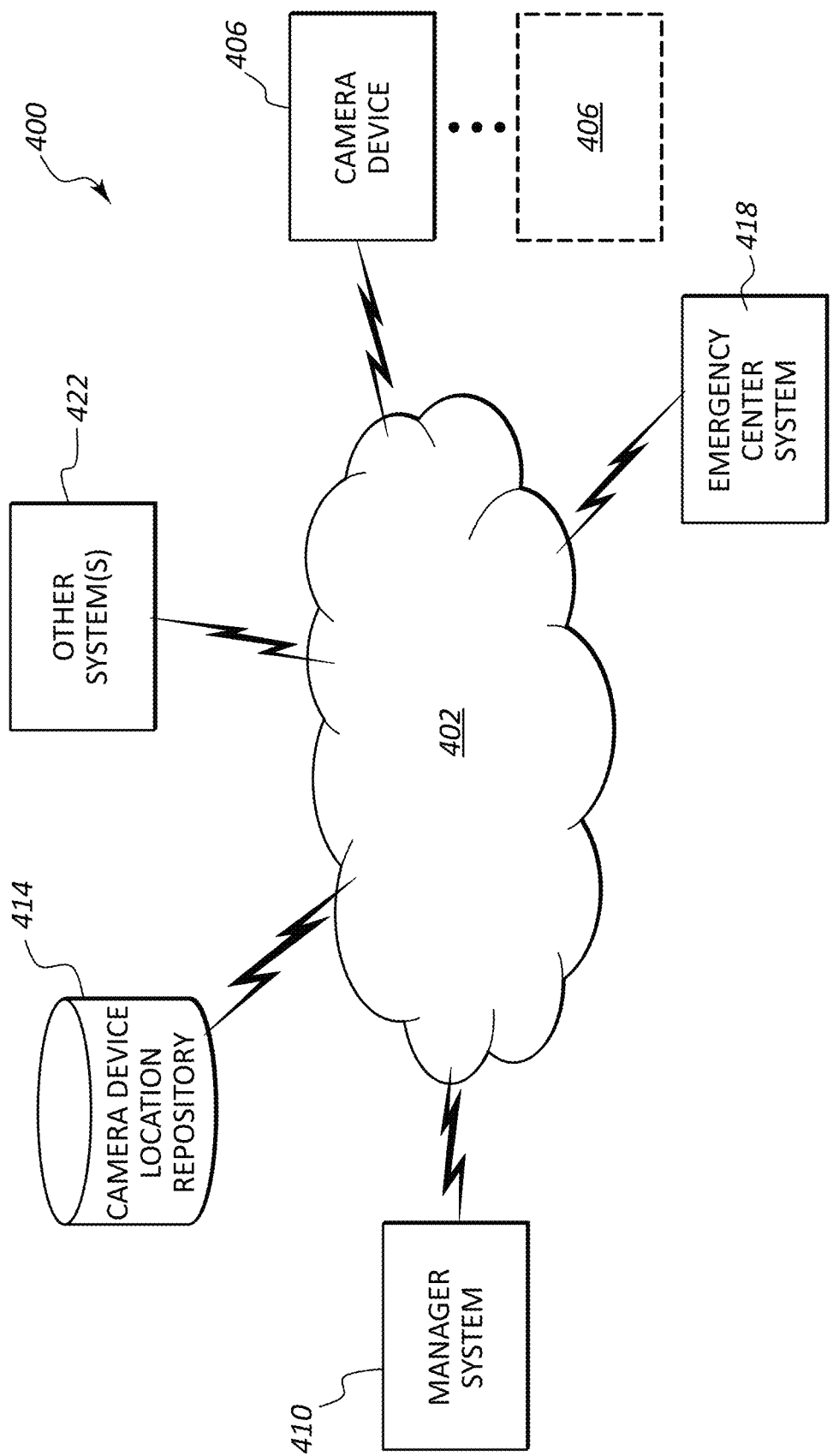
FIG. 4 is a block diagram of a system in accordance with an embodiment as set forth herein.

FIG. 4 is a block diagram of a system 400, in accordance with an embodiment as set forth herein. In the embodiment of FIG. 4, system 400 includes numerous devices, which may be or include computing nodes 100 as previously described, connected by a network 402. For example, network 402 may be a physical network or a virtual network. A physical network can be, for example, a physical telecommunications network connecting numerous computer nodes or systems, such as computer servers and computer clients. By contrast a virtual network can, for example, combine numerous physical networks or parts thereof into a logical virtual network. In another example, numerous virtual networks can be defined over a single physical network.

By way of explanation, FIG. 4 depicts an example environment. In one embodiment, system 400 can include one or more camera device 406 and a manager system 410. In one embodiment, system 400 can include a camera device location repository 414, emergency center system 418 and other system(s) 422. Each of camera device 406, manager system 410, camera device location repository 414, emergency center system 418 and other system(s) 422 can include one or more computing node 100 an embodiment of which is shown in FIG. 3. Each computing node 100 can run one or more program. Shown as being external to manager system 410, camera device location repository 414 can alternatively be co-located with manager system 410 or one or more camera device 406. In some embodiments, camera device location repository 414 can be maintained by one or more cellular communication service providers. One or more program 440 which can run on one or more computing node 100 of manager system 410 can obtain information, e.g. from one or more camera device 406 and camera device location repository 414. In one embodiment, each of one or more camera device 406, manager system 410, camera device location repository 414, emergency center system 418 and other system(s) 422 can be remote from each other.

Regarding camera device 406, camera device 406 in one embodiment can include a computing node 100 provided by a client computer, e.g. a camera equipped mobile device, e.g. a smartphone or tablet, a laptop or PC that runs one or more program including a web browser for browsing web pages. System 400 can include a plurality of camera devices 406 as indicated by camera device 406 shown in dashed form in FIG. 4.

Figure 5:
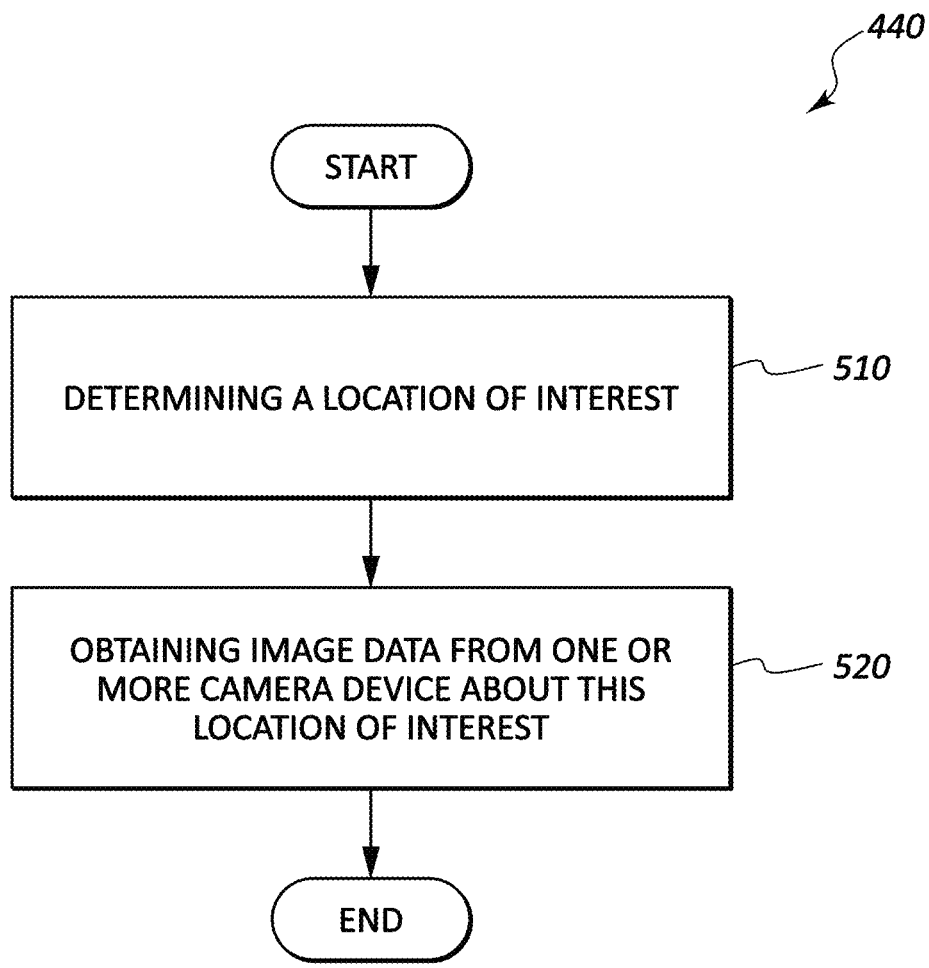
FIG. 5 is a flow diagram illustrating a method in accordance with an embodiment as set forth herein.

FIG. 5 is a flow diagram illustrating a method, in accordance with one or more aspects set forth herein. By way of example, the method described with respect to FIG. 5 can be performed using one or more program 440 running on one or more device e.g., of manager system 410 (FIG. 4) having one or more computing node 100 as described with respect to FIG. 3. In one embodiment, one or more program 440 can provide the functionality of image data obtaining 96.

In the embodiment of FIG. 5, one or more program 440 at block 510 can perform determining a location of interest. At block 520 one or more program 440 can perform obtaining image data from one or more camera device about the location of interest. In one embodiment the location of interest can be a location of an event. In one embodiment the location of an event can include e.g. a location of a crime, an accident, a natural disaster, an entertainment performance or the like. In one embodiment, the obtaining image data can include establishing a geofence (a geographic area about an event location). In one embodiment the obtaining image data can be based on information obtained from a camera device location repository 414. In one embodiment, the obtaining image data can include obtaining live image data. In one embodiment, the obtaining image data can include obtaining live video streaming image data.

In one embodiment, one or more program 440 can provide a technique for obtaining image data representing an event.

Embodiments herein recognize that in an emergency management situation, it can be important for command center operators to be able to access live video of an ongoing situation in order to help them assess and coordinate the appropriate response. Embodiments herein recognize that having access to live video on-demand from the ideal view/angle/perspective, or combination of such views, would be helpful.

Embodiments herein recognize that while there are many cameras physically installed by businesses and even by authorities, they do not and cannot not cover all areas, and are not accessible from the emergency management center on-demand in real-time.

Embodiments herein recognize limitations with existing surveillance camera systems. Notably, cameras of such systems are often incapable of providing an entirety of views representing an event even with pan-tilt-zoom (PTZ) control. For example, an event may occur at the top of a building but a fixed surveillance camera may not be configured to have an upward view or can only see the incident from one angle. As another example, it would be difficult if not impossible for existing fixed surveillance cameras to cover incidents with random areas (e.g., remote areas, obscured street corners) or with moving objects (e.g., cars, trains, airplanes).

Embodiments herein recognize that even when persons are proactive enough to capture image data representing an event and want to share the information, they may not know who know how/where/who to send it in a timely manner. The technology is already present to allow a mobile device to broadcast live videos (e.g., for personal or business events, peer-to-peer communication, interesting moments).

Embodiments herein recognize that there is currently no easy way for emergency management staff to properly identify persons who have mobile devices capable of live video broadcasting and are in relevant area during an emergency, to be able to make on demand requests for the persons to enable their live camera views for the benefit of the command center provided by manager system 410, and with the ability to interactively instruct the persons on camera angles/zoom/target area etc., in real time, based on a current on or more input into a user interface of manager system 410.

Figure 6:
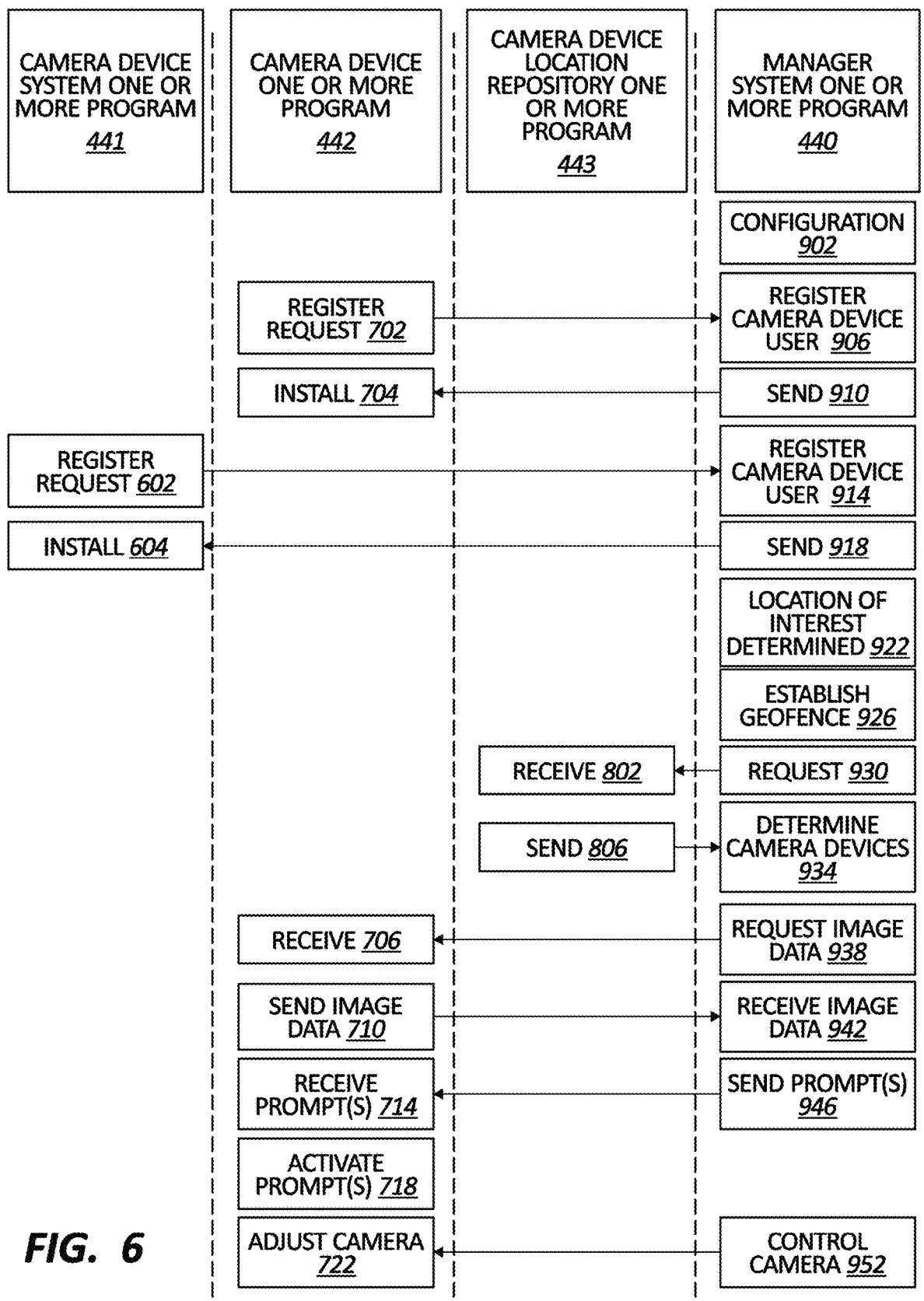
FIG. 6 is a flow diagram illustrating a method in accordance with an embodiment as set forth herein.

FIG. 6 is a flow diagram illustrating further aspects of a method for image data obtaining in accordance with an embodiment as set forth herein. By way of explanation, in FIG. 6, method elements are illustrated from the point of view of a manager system one or more program 440 (e.g., running on manager system 410 of FIG. 4), camera device one or more program 441 running on a camera device 406, camera device one or more program 442 running on another camera device 406 and camera device location repository 414, and one or more program 443 running on camera device location repository 414. While the flow diagram of FIG. 6 depicts a relatively distributed computing environment, any distribution scheme for functions corresponding to those described in reference to the flow diagram of FIG.

6 can be selected. In one embodiment, functions corresponding to all of the functions described in reference to the flow diagram of FIG. 6 can be performed by one or more program, e.g., one or more program 440 running on a single computing node 100 (FIG. 3).

In one embodiment, some or all of the one or more program 440, 441, 442, 443 may run on a different collection of physical or virtual machines or processors, depending on the need for scalability of the system. In one embodiment, each of the one or more program 440, 441, 442, 443 can run on a different computer node 100. In one specific example, each of the one or more program 440, 441, 442, 443 can run on a single multi-processor computer system. In one specific example, each of the one or more program 440, 441, 442, 443 can run on a single single-processor computer system. In another specific example, various portions of manager system one or more program 440 may run on different processors running on different computing nodes 100. In another specific example, various portions of one or more program 441 may run on different processors running on different computing nodes 100. In another specific example, various portions of one or more program 442 may run on different processors running on different computing nodes 100. In another specific example, various portions of one or more program 443 may run on different processors running on different computing nodes 100.

By way of overview, FIG. 6 illustrates, at least in part, one or more embodiment in which image data can be obtained from one or more camera device.

In one embodiment, at block 902 manager system one or more program 440 can perform a configuration process to configure manager system one or more program 440 for performance of image data obtaining functions. Configuration options can be based on e.g. one or more operator user input that is input using a user interface. Configuration options can include options to designate a manner in which an event is to be identified, options to designate, e.g. a manner in which a geofence is to be established.

At block 702 camera device one or more program 442 can send a request to register a camera device 404 to manager system 410 and at block 602 one or more one or more program 441 can send a request to register another camera device 406 to manager system 410. In response, manager system one or more program 440 can perform registration at block 906 and block 914 to register the first and second camera devices 406 respectively to manager system 410. In response to the registrations, one or more program 440 can send at block 910 and 918 program code for installation by the one or more programs 442 and 441 in the respective first and second camera devices at blocks 704 and 604. Program code installed at blocks 704 and 604 in first and second camera devices 406 can be specially adapted code to operate with system 400 (FIG. 4) e.g. can include code to provide particular image obtaining functionality according to requirements of system 400. A method herein can include receiving a request to register a camera device 406 into a manager system and in response to the request sending camera control program code to the camera device 406 for installation on the camera device 406. In one embodiment, tens, hundreds, thousands or millions of camera devices might be registered into manager system 410, of which two are represented by one or more program 442 and one or more program 441 running on respective first and second camera devices 406. When a camera device 406 is registered to manager system 410 the registered camera device 406 can be messaged by manager system one or more program 440 running on manager system 410. In one embodiment one or more program 441 and one or more program 442 can include web browsers facilitating sending of registration requests and one or more program 440 can include a website having webpages for presentment of information on registration and for receipt of registration requests.

At block 922 one or more program 440 can perform determining a location of interest. In one embodiment, the location of interest can be a location of an event. The event can be an emergency event e.g. a crime, an accident, a natural disaster, an entertainment performance, and the like. In one embodiment the location of interest can be a location of a location changing event. In one embodiment, determining a location of interest can include determining that an event has occurred. In one embodiment manager system one or more program 440 can determine that an event has occurred based on one or more input that is input into manager system 410 by an operator user. For example, by entry of one or more input into a user interface of manager system 400 an operator can designate that an event has occurred and can designate a location of an event as the location of interest. In another embodiment, as set forth herein one or more program 440 can examine content of an external system having an external data source e.g. from emergency center system 418 and can responsively identify an event occurrence based on the examining of content from the external data source.

At block 926 manager system one or more program 440 can establish a geofence about a location of event. A boundary for a geofence can be established by default and/or in accordance with one or more user input that is input into a user interface of manager system 400. A geofence can include a geographical area within a boundary. Such boundary can be defined by X, Y, and Z coordinates. One or more program 440 can establish a geofence based on one or more criteria which one or more criteria can be determined automatically by default or which can be user defined criteria. In one embodiment, such criteria can be designated during performance of configuration block 902. Criteria can include e.g. a boundary of a geofence relative to an event location which boundary can be defined in two or more of the X, Y, and Z dimensions and type of event. In one embodiment, system 400 can be configured to that default dimensions of a geofence change based on event type. For example, a crime event can have a larger geofence boundary and area in one embodiment than an accident event. Defined geofence parameters can be default parameters subject to alteration by an operator in real time, e.g. based on one or more current user input that is input into a user interface of manager system 410.

Manager system one or more program 440 can request from location repository one or more program 443 at block 930 identifiers for registered camera devices 406 within the established geofence established at block 926. The geofence in one embodiment can include X, Y, and Z dimension boundary coordinates. Location repository one or more program 443, e.g. running on camera device location repository 414 can receive the request of block 930 at block 802 and can return the requested camera device identifiers at block 806.

At block 938 manager system one or more program 440 can request image data from one or more program 442 and at block 710 one or more program 442 can return image data to one or more program 440. At block 938 requests for image data can be made to all camera device addresses corresponding to the identifiers returned at block 806. Note that in the specific embodiment of the flow diagram of FIG. 6 a request for image data may be sent to one or more program 442 associated with a first camera device but not to one more program 441 associated to a second camera device 406. In the described embodiment the first camera device 406 may be internal to the geofence and the second camera device 406 may be external to the geofence. Requests for image data may be made only to devices within the geofence in one embodiment. In one embodiment, one or more program 440 responsively to a geofence being established at block 926, e.g. automatically in response to a geofence being established, can initiate communications with camera devices 406 within the established geofence. The communications initiated can include requests for image data as set forth in reference to block 930.

Figure 7:
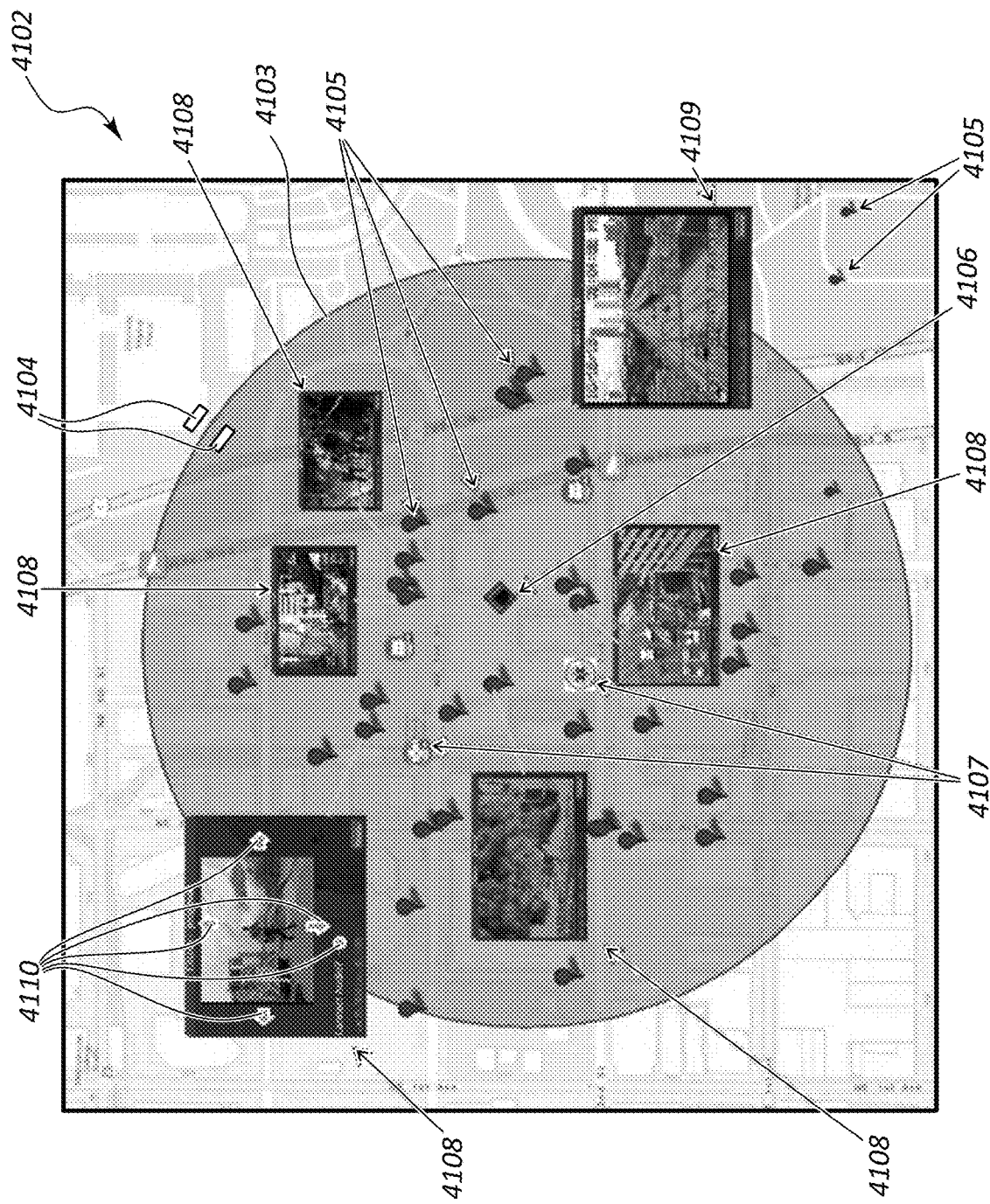
FIG. 7 illustrates a manager system user interface in accordance with an embodiment as set forth herein.

An embodiment of a user interface of manager system 410 is shown in FIG. 7. User interface 4102 can be displayed on a display of manager system 410, e.g. on a display of one or more computer node 100 of manager system 410. In one aspect user interface 4102 can include a geofence boundary representation 4103 representing the geofence defining boundary within which camera devices can be enabled to receive request for image data. In one embodiment, user interface 4102 can include controls 4104 allowing one or more program 440 to change one or more of a size, shape, or location of a geofence based on one or more current operator input entered into a user interface 4102 of a manager system 410 to change a boundary representation, e.g. representation 4103, or representation 5103 as set forth herein.

User interface 4102 can include controls 4104 allowing an operator user of manager system 410 to define a shape of a boundary of a geofence defining a geofence and represented by boundary representation 4103 into any arbitrary shape. A boundary of a geofence defining a geofence and represented by boundary representation 4103 can be changed based on or more current input of a user e.g. using controls 4104 while one or more program 440 displays image data from multiple camera devices 406 on a display of manager system 410. One or more program 440 can be configured so that as additional one or more camera devices 406 are included within a boundary of a geofence by way of a user changing the boundary of a geofence e.g. using controls 4104 one or more program 440 e.g. running on manager system 410 automatically initiates communication with any new camera devices 406 within the boundary represented by boundary representation 4103. The initiated communication can be e.g. a communication to request image data e.g. as described at block 938. One or more program 440 can be configured so that as additional one or more camera devices 406 are included within a boundary of a geofence by way of a user changing the boundary of a geofence e.g. using controls 4104 one or more program 440 e.g. running on manager system 410 automatically displays image from the one or more camera device, e.g. video streaming image data. One or more program 440 can be configured so that as one or more camera devices 406 are no longer included within a boundary of a geofence by way of a user changing the boundary of a geofence e.g. using controls 4104 one or more program 440 e.g. running on manager system 410 automatically stops displaying image data of such one or more camera device and automatically terminates communication with such one or more camera device 406 no longer within the user defined geofence boundary. In such manner an operator's attention can be better focused on more pertinent image data, and network resources formerly allocated to supporting obtaining and displaying image data from camera devices 406 within a geofence boundary can be reallocated to supporting obtaining and displaying of image data, e.g. streaming video image data from camera devices 406 currently within a geofence boundary.

In one embodiment, changing a geofence boundary to include one or more camera device 406 within a geofence boundary can increase a communication activity level of manager system 410 with the one or more camera device 406 included, e.g. can change from lower bandwidth requirement communication activity e.g. no communication or restricted to status data communication, to higher bandwidth requirement communication activity e.g. video streaming.

In one embodiment, changing a geofence boundary to exclude one or more camera device 406 can decrease a communication activity level of manager system 410 with the one or more camera device 406 excluded, e.g. can change from a higher bandwidth requirement communication activity e.g. video streaming to a lower bandwidth requirement communication activity e.g. no communication or restricted to status data communication.

User interface 4102 of FIG. 7 depicts a displayed user interface in a state subsequent to obtaining of image data at block 942. In a state prior to obtaining of image data user interface 4102 as depicted in FIG. 7 can be without displayed image data.

One or more program 440 can include functionality to prioritize views from different camera devices 406. When a display of image data is prioritized the display may be provided e.g. in windows of different sizes as shown in the embodiment of FIG. 7 with higher priority windows displayed in larger sizes. Alternatively or in addition different windows can be displayed with indicators (e.g. "1", "2" etc.) to indicate priority. A location of various camera devices 406 within a geofence can be indicated by icons 4105. Icons 4107 indicate locations of other resources e.g. fire trucks and EMS vehicles location as such resources can be obtained by one or more program 440 from other system(s) 422 (FIG. 4). One or more program 440 can be in communication with camera device location repository one or more program 443 so that user interface 4102 displays icons indicating a location of camera devices 406 both internal and external to a border of a geofence represented by geofence representation 4103. By indicating with user interface 4102 one or more camera device 406 external to a geofence boundary an operator user of manager system 410 is informed that by expanding a border of a geofence one or additional camera device 406 can be encompassed within a geofence. One or more program 440 can be operative so that an operator at manager system 410 can view image data from any camera device by clicking on an icon corresponding to the camera device 406, and one or more program 440 can prioritize selected views. In one embodiment, one or more program 440 can indicate that a view of a certain camera device 406 has been prioritized by automatically displaying image data of the camera device without prior selection or the camera device by an operator. One or more program 440 prioritizing of views of different camera devices 406 can result in one or more of the following occurring (a) image data of a prioritized view transitioning from a non-displayed state to a displayed state, (b) image data from a higher priority view being displayed in a larger size than a lower priority view, (c) image data of a higher priority view being displayed with an indicator indicating a higher priority.

One or more criteria to determine priority of views from different camera devices 404 can include e.g. one or more of a quality of image data, a proximity of the camera device to an event, or a history of user of a camera device 406. Regarding image data quality, one or more program 440 can use a variety of resources to determine image quality, e.g. the hardware specifications of the camera device. Regarding history of a user, one or more program 440 can score performance of a user during an event, e.g. based on total display time of image data, responsiveness of a user to operator instructions (e.g. % of times a user responds to an operator instruction) operator input scoring entered into a user interface. Priority can be determined based on one or more of user scoring during a current event being represented by image data displayed by user interface 4102 or user scoring during one or more prior event. A prioritizing of views from different camera devices 406 can be based on a criteria including one or more of the following: (a) image quality of views of the camera devices 406, (b) a proximity of the camera devices to an event, (c) a history of usage of users of the camera devices 406 during a current event, (d) a history of usage of users of the camera devices 406 during a past event.

One or more program 440 can include functionality to obtain information from other system(s) 422 as shown in the system view of FIG. 4. Other system(s) can include image data of e.g. municipality security organizations and/or private security organizations. Other system(s) can include databases storing emergency relief information, e.g. locations of fire departments, police stations and hospitals. Referring to user interface 4102 user interface 4102 can display indicators of the location of e.g. fire trucks or EMS responders as shown in FIG. 7. Icon 4106 indicates a location of an event e.g. a fire. Video views 4108 depict video views of various camera devices 406 within a geofence. Video view 4109 is a video view from other system(s), e.g. a fixed surveillance camera view from a private security enterprise or government agency. Controls 4110 are controls for sending prompt messages to a camera device 406, as is set forth in greater detail herein.

Figure 8:
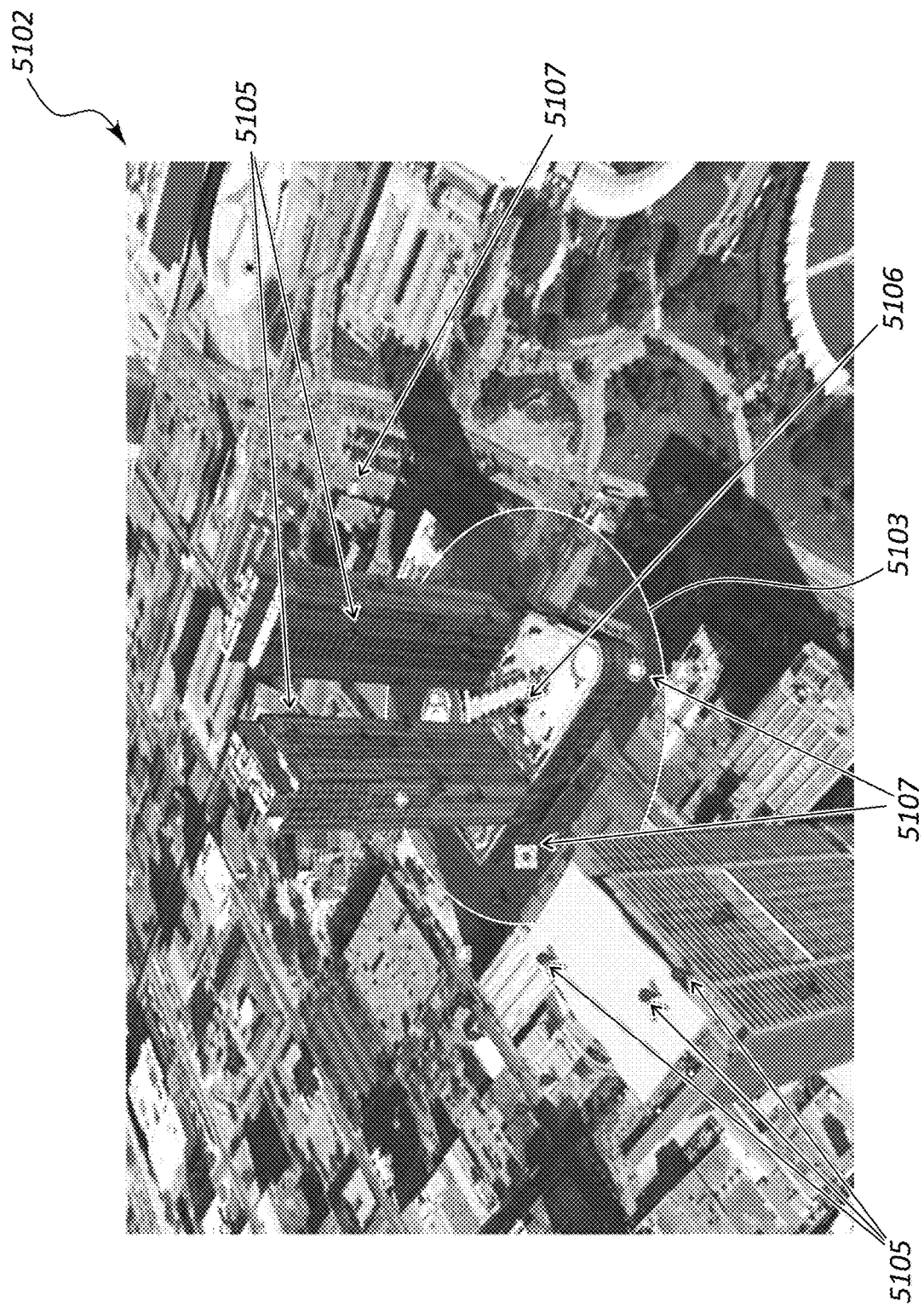
FIG. 8 illustrates a manager system user interface in accordance with an embodiment as set forth herein.

One or more program 440 can include functionality so that different user interfaces of manager system 410 for use by an operator of manager system 410 can be displayed alternatively or simultaneously. An alternative user interface 5102 is shown in FIG. 8. User interface 5102 as shown in FIG. 8 can include a three dimensional (3D) view of an observation area which can include areas within a geofence boundary defining a geofence represented by geofence boundary representation 5103 and areas external to a geofence boundary. User interface 5102 can include controls such as controls 4104 (FIG. 7) to allow an operator user to change a boundary of a geofence by changing a boundary of boundary representation 5103 while user interface 5102 simultaneously displays image data from a plurality of camera device 406. In one embodiment, system 400 can be configured so that a user can change two or more of X, Y, and Z dimension coordinates of a geofence boundary by changing boundary representations. Functions described in connection with changing of a geofence represented by boundary representation 5103 can occur by changing of boundary representation 5103. A geofence defined by a boundary represented by a geofence boundary representation, e.g. 4103 and/or 5103, can have any two dimensional (i.e., without height based boundaries) or three dimensional shape, e.g. can be polygonal, circular, ellipsoid, any other arbitrary two dimensional shape, cubical, spherical, conical, or any other arbitrary three dimensional shape.

Figure 9:
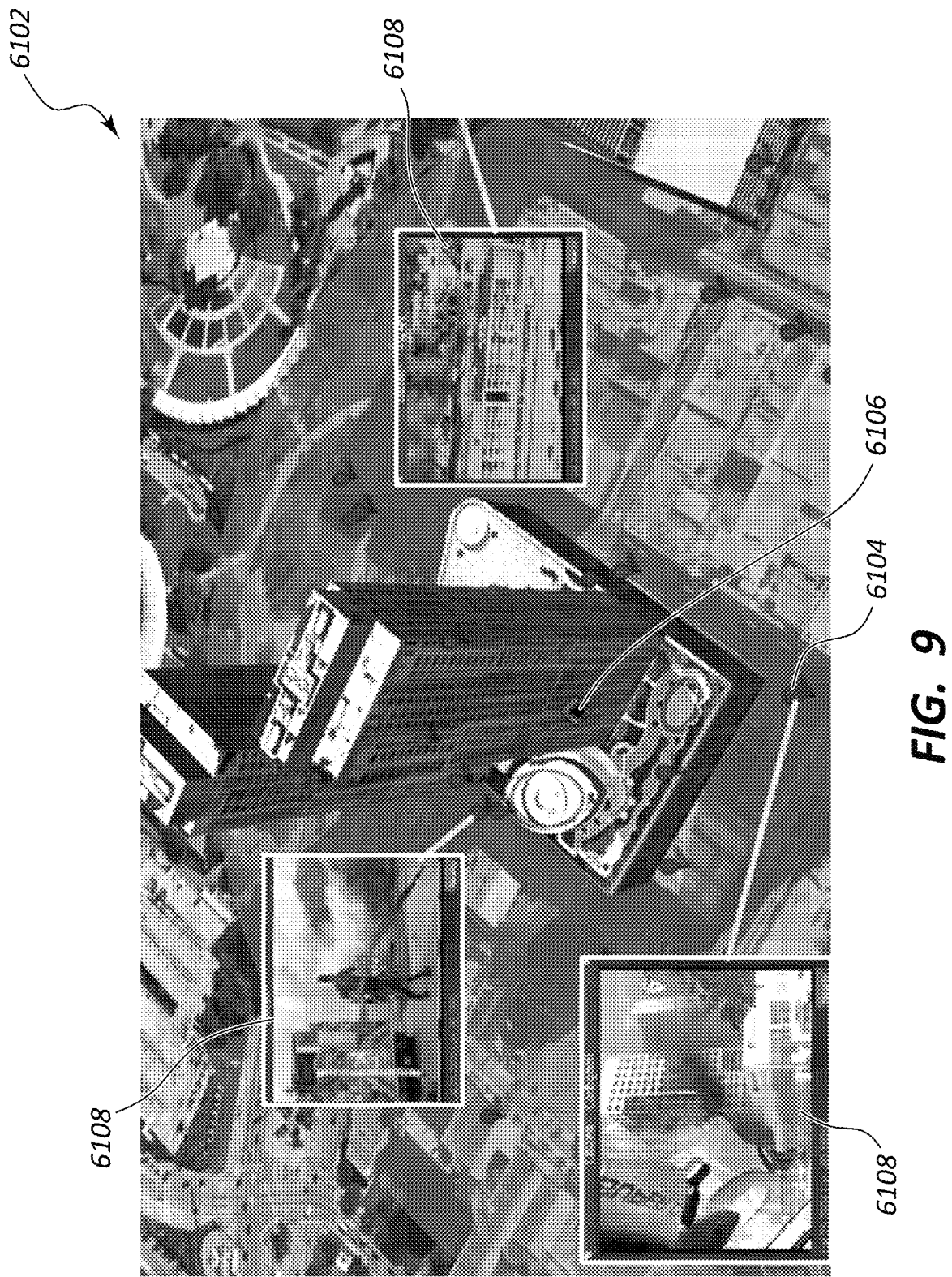
FIG. 9 illustrates a manager system user interface in accordance with an embodiment as set forth herein.

The embodiment of FIG. 8 recognizes that 3D information can be pertinent to an event. For example, an event can occur on the Nth floor of a building and camera devices 406 closer to the Nth floor can have increased capability to produce image data representing an event. With a fleet of camera devices both above and below the location of the event, the event can be comprehensively represented. Referring further to the user interface 5102 in FIG. 8, icons 5107 indicate other resources e.g. fire trucks and EMS vehicles location as such resources can be obtained by one or more program 440 from other system(s) 422 (FIG. 4). Icons 5105 can indicate locations of camera devices 404. It is seen that camera devices internal and external to a geofence can be represented. Icon 5106 indicates a location of an event. In reference to the user interface 5102 at FIG. 9, it is seen that with a 3D view, various views from different elevators relative to the location of the event (depicted by icon 5106) can be selected and presented.

Referring to the flow diagram of FIG. 6, one or more program 440 at block 946 can send one or more prompt message to one or more program 442. One or more prompts can be sent based on one or more input into a user interface of manager system 410 input by an operator user, e.g. using controls 4110 shown in the user interface 4102 of FIG. 8. In response to receipt of the prompt message at block 714 one or more program 442 at block 718 can activate prompts according to the one or more prompt messages. The user interface 4102 of FIG. 6 illustrates exemplary controls 4110 which may be used by an operator user of manager system 410 to define prompts for transmission to a camera device 406. These controls 4110 are also shown in the view of user interface 7102 as shown in FIG. 10. In FIG. 11 there is shown an exemplary camera device user interface 8102 in which one or more defined prompts can be displayed on a camera device 406. A camera device user can respond to the one or more prompt by operating a camera device according to the one or more prompt resulting in an alteration of image data being sent for display to manager system one or more program 440. A prompt that prompts a certain operation can e.g. prompt a user of camera device 406 to enter one or more input into a camera device 406 and/or to manually change one or more of a location or an orientation of a camera device 406.

In one embodiment one or more program 440 can be operative for sending one or more prompt message to a camera device 406 for prompting of a user of the camera device to operate the camera device 406, the sending including sending the one or more prompt message from a manager system 410 based on one or more input entered into a user interface of the manager system 410 by an operator of the manager system 410. For example, actuation of a particular control of controls 4110 (FIG. 10) by an operator of manager system 410 can cause a particular indicator (e.g. one or more or text based, graphics based or aural based) to be presented by a user interface 8102 of camera device 4016 (FIG. 11) prompting particular operation of camera device 406 by a user of camera device 406 remote from manager system 410. A user interface of the manager system 410 can be remote from the camera device 406 and the sending the one or more prompt message can be performed while live (current) image data from the camera device 406 is being displayed on a display of the manager system 410 e.g. on a displayed user interface.

In one embodiment, sending one or more prompt message to a camera device 406 for prompting of a user of the camera device 406 to operate the camera device 406 can include automatically sending the one or more prompt message from a manager system 410 independent of any current operator input entered into a user interface of the manager system 410 by an operator of the manager system 410. Sending of one or more prompt message can be performed while live image data from the camera device 406 is being displayed on a display of the manager system 410 remote from the camera device 406.

In one embodiment, a location of interest is a location of a location changing live event and sending one or more prompt message to a one or more camera device 406 for prompting of respective users of the one or more camera device 406 to operate the one or more camera device 406 can include sending one or more prompt message to prompt the respective users of the one or more camera device 406 to change one or more of a location or orientation of the one or more camera device 406 to optimize a representation of the live event. In one embodiment, a method can include automatically defining one or more prompt message based on a location of the live event and a camera device 406 to which the one or more prompt message is sent. In one embodiment, a method can include automatically updating and sending to camera device 406 one or more prompt message based on a location of the live event and the camera device 406.

In one embodiment, a location of interest can be a location of a location changing live event and a method can include automatically defining a plurality of prompt messages based on a location of the live event and a location of respective camera devices 406 to which the plurality of prompt messages are sent. The prompt messages can be prompt messages to prompt the respective users of the camera devices 406 to move the one or more camera device 406 in one or more of a direction or orientation to optimize a representation of the live event. In one embodiment, a method can include automatically updating and sending to respective camera devices 406 a plurality of prompt messages based on a location of the live event and the respective locations of the plurality of camera devices 406. For example, one or more program 440 can be continually examining relative location coordinates of a live event and camera devices 406 within a defined area e.g. within a geofence. One or a plurality or all of the camera devices 406 can be moving, e.g. via a user walking or running and/or manually changing a location and/or orientation of a camera device. Similarly, a live event can be a location changing event, e.g. involving a spreading fire (with location updates reported by an operator of manager system 410 or by camera device users of system), a moving one or more person (e.g. carrying one or more location reporting device), a moving one or more animal (e.g. carrying one or more location reporting device), a moving one or more vehicle (e.g. carrying one or more location reporting device). Based on the continual examining of relative location coordinates one or more program 440 can automatically determine user understandable movement prompts, e.g., "run straight," "walk north," "turn left" "run left," "aim camera device up," "aim camera device up and right". The prompt messages can result in corresponding prompts in the form of indicators being presented by user interfaces of corresponding camera devices 406. The indicators can be one or more of text based, graphics based or aural (e.g. voice) based. Voice based prompts can be particularly helpful where there is a need for a camera device user to move quickly and may not have capacity to clearly view a displayed prompt.

In one embodiment, one or more program 440 can be operative to automatically define and send prompt messages to a plurality of camera devices 406 to prompt respective users of those camera device 406 to change one or more of a location or orientation of their camera devices to optimize representation of location of interest, wherein the location of interest is a location of an event. One or more program 440 can be operative so that such defined and sent prompt messages can be automatically updated and sent as relative locations of one or more of camera devices 406 or events change. Skilled artisans will recognize that in such an embodiment, one or more program 440 can send different prompt messages to different camera devices 406 depending on the different relative locations of those camera devices 406 to an event.

One or more program 440 can be operative so that at any time at which a user interface of manager system 410 is displaying image data from a camera device 406, an operator can actuate a control e.g. a "connect audio?" control of controls 4410 (FIG. 10) to activate an aural connection between manager system 410 and camera device 406 to permit live voice communication between an operator user of manager system 410 and a camera device user of camera device 406. Live voice communications can be helpful e.g. to send prompt messages to prompt a camera device operation action by a camera device user, or to clarify a displayed prompt being displayed on a camera device 406.

One or more program 440 can include functionality so that an operator of manager system 410 can control one or more image data obtaining operation of camera device 406. Where one or more program 440 is operative to control one or more image data obtaining operation a camera device 406 image data operation of camera device 406 can be based on one or more input by an operator into a manager system user interface independent of any prompt sent or responded to by a camera device user. The manager system user interface e.g. interface 7102 as shown in FIG. 10 can be remote from the camera device 406 being controlled. In one embodiment, when sending a registration request at block 702 or block 602, a camera device 406 based on user input can send registration information granting permission for operator camera control and manager system 410 responsively at block 910 or block 918 manager system 410 can send requisite software facilitating operator control. A user interface of manager system 410 e.g. user interface 7102 (FIG. 10) can include particular controls 7110, 7112, 7114, facilitating manager system operator direct control of a camera device 406. In the particular embodiment control 7110 can allow access to camera control window 7112. Image data obtaining operations that can be controlled by a manager system one or more program 440 can include e.g. pan, tilt, zoom, resolution, tone, shading, color and the like, which can be adjusted using e.g. controls 7114 of user interface 7102. Camera devices 404 are expected to increasingly become available with enhanced pan tilt and zoom capabilities.

In one embodiment as set forth herein camera devices 406 can be provided by smartphones. In accordance with the flow diagram of FIG. 6 persons can be encouraged to download a mobile application to their smartphone for supporting various functions of system 400. For example, a public service advertising campaign can precede registration request blocks 702 and 602 advertising a website that allows registration. On completing registration, one or more program 440 can send program code for installing facilitating operations of camera devices 406 with system 400. Installed software installed by one or more program 441 or 442 can be regarded to be included as part of one or more camera device one or more program 441 or 442 on being installed.

In one embodiment, system 400 can be configured so that proper consent is required of persons to allow access to their camera phone for different functions e.g. to obtain location, to obtain image data, to allow manager system operator control of image data obtaining operations.

In one embodiment, when a location of interest has been determined such as a location of an event, the manager system 410 can identify registered camera devices and associated registered camera device users about the location of interest e.g., using X, Y and Z boundary coordinates defining a geofence. In one embodiment, when requested by manager system one or more program 440, a person must properly confirm access to their camera device 406. This mobile application e.g. as installed at block 704 or block 604 can then securely stream live video to the manager system 410 which in one embodiment can record all obtained image data. At this point the operator of manager system 410 at block 946 can prompt the person to move their camera device 406 in a particular direction based on the area of concern. Once a real-time view or views of the incident is established, an operator or manager system 410 can quickly determine a plan and can assist first responders.

Embodiments herein use crowdsourcing and mobile phones to support first responders during an emergency situation. Embodiments herein recognize that that people are generally willing to help when they can and the fact that smartphone are nearly ubiquitous in our society.

In one embodiment in response to a location of interest being determined manager system 410 can identify persons having registered camera devices about the location of interest to better monitor and gain insight into an incident, and access their camera view on demand.

In one embodiment as set forth herein manager system 410, e.g. running one or more program 440 can prioritize the available video feeds e.g., by visually indicating the persons with higher quality camera and/or examining history of usage of a camera device user.

In one embodiment as set forth herein manager system 410 e.g. running one or more program 440 can interactively instruct a persons to change the camera view on demand. This can be done e.g. through on-screen directional indicators or optionally via spoken instructions in the mobile application.

In one embodiment, interaction between an operator at a user manager system 410 and a person at a camera device 406 can be performed using current image data e.g. in real-time (as opposed to sending recorded videos, for example).

In one embodiment, a government or private enterprise may wish to enhance the safety of its persons via the implementation of manager system 410. Through a public advertising campaign, persons receive messages in various channels from the city to participate and to install e.g. at block 704 or block 604 requisite software to their camera device. Persons who are willing to participate can accept the promotion and download the mobile app location, e.g. by way of sending a registration request (block 704 or block 604).

In one embodiment, a person e.g. at block 704 or block 604 of the flow diagram of FIG. 6 can authorize manager system 410 to access the device location service e.g. camera device location repository 414 and image data obtained by a camera device 406. In one embodiment a person with use of a camera device e.g. at block 702 or block 602 can enter and send a profile (e.g. in the user registry) containing information like user name and contact information, phone capabilities and details, times when available and unavailable, frequency and method of notifications, default response (e.g. auto-accept), etc.

In one embodiment, emergency center system 418 as shown in the system view of FIG. 4 can be e.g. a call center responsible for answering calls to an emergency telephone number for police, firefighting and ambulance services. In one embodiment manager system one or more program 440 can examine data of a data repository of emergency center system 410 or other external data source for determining a location of interest.

In one embodiment manager system one or more program 440 can examine classifiers for incoming calls to determine a location of interest, wherein the location of interest is a location of an event. Classifiers for incoming calls can include e.g. type, severity, and complexity. In one embodiment classifiers for incoming calls can be stored in a data repository of emergency center system 418. Based on one or more of the incident type, severity or complexity, manager system 410 e.g. running one or more program 440 can identify at block 922 (FIG. 6) an incident having associated emergency call as an event invoking certain functionality of manager system 410 as set forth herein in connection with determining a location of interest where a location of interest is a location of an event. A data repository of emergency center system 418 can include data indicating a location of an event (e.g. a coordinate location, a street address translatable to a coordinate location) and one or more program 440 can examine such data to determine a location of an event. One or more program 440 can determine a location of an event based on one one or more operator input entered into a user interface of manager system 410. An operator can learn of an event location e.g. via voice call information received from emergency personnel including personnel of emergency center system 418. In one embodiment, manager system 410 can be co-located with emergency call center system 418, for example network administrator of emergency center system 418 can upgrade system 418 to include the functionality of manager system 418.

In one embodiment, one or more program 440 can be operative to determine location of interest, wherein the location of interest is a location of an event e.g. a live event based on examining of data from one or more camera device 406. System 400 can be operative so that one or more program 440 obtains image data from one or more camera device 406 prior to a location of interest being determined. For example, an incident can occur and system 400 can be operative so that users of camera devices 406 can self-report the incident by sending image data obtained using their respective camera devices 406 to manager system 410. One or more program 440 can be operative to determine a location of interest provided by a location of an event by examining image data representing an incident based on or more criteria. For example, one or more program 440 can be operative to determine an incident as a location of interest (e.g. as recognized using pattern recognition processing) is represented by image data from more than one camera device 406. One or more program 440 can determine a location of such identified location of interest provide by an event based on e.g. respective coordinate locations of camera devices 406 reporting the incident, and relative views of the reporting camera devices 406 at common times. One or more program 440 can confirm common timing between obtained image data within a threshold tolerance by examination of time stamps of obtained image data.

At block 926 manager system 410 e.g. running one or more program 440 can establish a geofence around the location of interest provided by a location of an event. Establishing a boundary defining a geofence can be automatic (e.g. 360 degree and a fixed radius), or manual (defined/drawn on a geospatial map e.g. defined using controls 4104 as set forth in connection with user interface 4102 described in reference to FIG. 7). Manager system 410 can provide e.g. geospatial map representation/visualization, incident management and asset management capabilities.

In one embodiment manager system one or more program 440 can use secure communication functionality to send notification request for transmission of image data to all the participating persons registered with manager system 410 who are within the geofence. Communication between manager system 410 and devices 406 can be secure sockets layer (SSL) based.

In one embodiment, system 400 can be configured so that camera device one or more program e.g. program 442 can respond to a request for image data by sending image data without any user interface controls being entered by one or more user. In one embodiment, the persons in the event geofence region can accept or dismiss the request by entering one or more user interface control. Whether image data at block 710 (FIG. 6) is automatically sent based on a past permission or sent conditionally based on a current permission can be based on the entered user profile entered into manager system 410. Such profile information can be entered e.g. as part of a registration request (block 702 or block 602 of FIG. 6).

In one embodiment, a manager system 410 can communicate with one or more program 442 at block 938 to access the live video (and optionally audio communication). In one embodiment, based on one or more entered operator input into a user interface or manager system 410, manager system 410 can send one or more prompt including displayed coordinates (X, Y and Z) of an event location and one or more displayed directional indicators as indicated by controls 4110 (FIG. 6, FIG. 10) prompting a camera user to point their camera at toward that location.

In one embodiment based on the video received, an operator at manager system 410 using a user interface of manager system 410 e.g. user interface 1402 as shown in FIG. 6 can select the video streams to be viewed/analyzed. One or more program 440 can display image data based on a determined priority. Optimization criteria for indicating 'priority views' can be based e.g. on previous usage and/or hardware capabilities.

In one embodiment at block 946 an operator using a user interface of manager system 410 can send prompts to the person's camera device 401 to prompt a camera device user to pan/tilt/zoom or move the camera view as appropriate. In one embodiment e.g. at block 952 an operator using a user interface of manager system 410 can enter one or more input to control one or more image data obtaining operation of a camera device 406 e.g. using controls 7114 as shown in FIG. 10.

In one embodiment an operator at manager system 410 can use the video views as appropriate to gain insight and monitor an event.

In one embodiment, all acceptable video relating to the incident received from the person's device can be stored and managed for later analysis and playback.

Methods, computer program products for performing methods, and systems for performing methods are presented and can include for instance: determining a location of interest; and obtaining image data from one or more camera device about the location of interest.

A method as set forth herein can provide additional information about an event, such as image data representing an event.

In one embodiment, the location of interest can be a location of a live event and the obtaining can include obtaining for display crowdsourced image data from a plurality of camera devices 406, wherein crowdsourced image data includes image data representing the live event. In such embodiment, additional information about the live event can be provided, such a crowdsourced image data from a plurality of users using respective camera devices 406, each having the ability to provide image data from a different vantage point.

In one embodiment, the obtaining image data from one or more camera device 406 about a location of interest can include establishing a geofence and determining camera devices 406 within the geofence. A geofence can be established based on one or more criteria and/or one or more operator user input. In an embodiment establishing a geofence can provide a convenient way to determine camera devices 406 about a location of interest from which image data may be obtained.

In one embodiment, obtaining of image data can include prioritizing views from camera devices 406 of the one or more camera device 406 from which to obtain image data. Prioritizing image data can increase the usefulness of presented information presented to an operator of a management system 410 by increasing attention to image data determined likely to include improved representation of a location of interest such as a location of an event.

In one embodiment, the determining a location of interest can include examining information of an external system, such as an emergency center system 418. Examining information of an external system for determining a location of interest leverages use of the external system, and augments performance of the present system and the external system.

In one embodiment, a method can include sending one or more prompt message to a camera device 406 for prompting of a user of the camera device to operate the camera device 406 while live image data from the camera device 406 is being displayed by a display of manager system 410. Embodiments where one or more prompt message is sent can improve image data obtained by improving the likelihood that improved image data is representative of a location of interest such as a location of an event.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" encompass relationships where an element is partially based on as well as relationships where an element is entirely based on. Forms of the term "defined by" encompass relationships where an element is partially defined by as well as relationships where an element is entirely defined by. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:
   determining a location of interest, the location of interest being a location of a live event; obtaining image data, wherein the obtaining includes obtaining for display crowdsourced image data from a plurality of users located about the location of interest, wherein crowdsourced image data includes image data representing the live event, wherein the obtaining includes prioritizing views from respective camera devices of the plurality of users, wherein the prioritizing views results in an occurrence of image data of a higher priority view being displayed with an indicator indicating a higher priority; and
   displaying data of the crowdsourced image data representing the live event.

2. The computer implemented method of claim 1, wherein the prioritizing is in dependence on image quality of views of the camera devices.

3. The computer implemented method of claim 1, wherein the prioritizing is in dependence on a history of usage of a user of a camera device of the camera devices during a past live event.

4. The computer implemented method of claim 1, wherein the location of interest is a location of a live event, wherein the obtaining includes establishing a geofence to define a determined geofence and determining devices within the geofence, the establishing a geofence is in dependence on a number of devices in an area about the live event.

5. The computer implemented method of claim 1, wherein the location of interest is a location of a live event, wherein the obtaining includes establishing a geofence to define a determined geofence and determining devices within the geofence, the establishing a geofence is in dependence on a type of the live event.

6. The computer implemented method of claim 1, wherein the obtaining includes establishing a geofence and identifying camera devices within the geofence, wherein the establishing a geofence is in dependence on one or more current operator input of an operator user entered into a user interface of a manager system, and wherein the manager system initiates communication with the camera devices within the geofence responsively to the identifying.

7. The computer implemented method of claim 1, wherein the obtaining includes establishing a geofence to define a determined geofence and identifying camera devices within the geofence, wherein the establishing a geofence is based on one or more current operator input of an operator entered into a user interface of a manager system, wherein the establishing is performed so that the manager system defines X, Y and Z boundaries of the geofence based on one or more input of the operator into a user interface of the manager system.

8. A computer implemented method comprising:
   determining a location of interest, the location of interest being a location of a live event; obtaining image data, wherein the obtaining includes obtaining for display crowdsourced image data from a plurality of users located about the location of interest, wherein crowdsourced image data includes image data representing the live event, wherein the method includes sending one or more prompt message to a camera device of a user of the plurality of users for prompting the user of the camera device to operate the camera device, wherein the sending the one or more prompt message is performed while live image data from the camera device is being displayed on a display, and wherein the one or more prompt message prompts the user of the camera device to change one or more of a location or orientation of the camera device to optimize a representation of the live event; and
   displaying data of the crowdsourced image data representing the live event.

9. The computer implemented method of claim 8, wherein the method includes automatically defining the one or more prompt message based on a location of the live event and the camera device.

10. The computer implemented method of claim 8, wherein the live event is a location changing live event and wherein the one or more prompt message prompts the user of the camera device to change one or more of a location or orientation of the camera device to optimize a representation of the live event, wherein the method includes automatically defining the one or more prompt message based on a current location of the location changing live event and the camera device.

11. The computer implemented method of claim 8, wherein the method includes controlling one or more image obtaining operation of the camera device based on one or more input entered into a user interface of a manager system by an operator of the manager system, the user interface of the manager system being remote from the camera device, wherein the live event is a location changing live event, wherein the method includes automatically defining the one or more prompt message based on a current location of the location changing live event and the camera device.

12. The computer implemented method of claim 8, wherein the method includes sending differentiated prompt messages to first and second camera devices associated respectively to a first user and a second user of the plurality of users, wherein the differentiated prompt messages prompt the first user and the second user, respectively, to change one or more of a location or orientation of their respective camera device to optimize a representation of the live event, wherein the method includes automatically defining the differentiated prompt messages based on a location of the live event, the first camera device and the second camera device, wherein the sending includes automatically sending the differentiated prompt messages from a manager system independent of any current input entered into a user interface of a manager system by an operator of the manager system.

13. The computer implemented method of claim 8, wherein the method includes sending differentiated prompt messages to first and second camera devices associated respectively to a first user and a second user of the plurality of users, wherein the differentiated prompt messages prompt the first user and the second user, respectively, to change one or more of a location or orientation of their respective camera device to optimize a representation of the live event, wherein the live event is a location changing live event, wherein the method includes automatically defining and updating the differentiated prompt messages based on a current location of the location changing live event, the first camera device and the second camera device, wherein the sending includes automatically sending the differentiated prompt messages from a manager system.

14. The computer implemented method of claim 8, wherein the method includes automatically defining the one or more prompt message in dependence on a location of the live event.

15. The computer implemented method of claim 8, wherein the method includes automatically defining the one or more prompt message in dependence on a location of the camera device.

16. The computer implemented method of claim 8, wherein the method includes sending differentiated prompt messages to first and second camera devices associated respectively to a first user and a second user of the plurality of users, wherein the differentiated prompt messages prompt the first user and the second user, respectively, to change one or more of a location or orientation of their respective camera device to optimize a representation of the live event.

17. The computer implemented method of claim 8, wherein the method includes sending differentiated prompt messages to first and second camera devices associated respectively to a first user and a second user of the plurality of users, wherein the differentiated prompt messages prompt the first user and the second user, respectively, to change one or more of a location or orientation of their respective camera device to optimize a representation of the live event, wherein the method includes automatically defining the differentiated prompt messages in dependence on a location of the live event.

18. The computer implemented method of claim 8, wherein the method includes sending differentiated prompt messages to first and second camera devices associated respectively to a first user and a second user of the plurality of users, wherein the differentiated prompt messages prompt the first user and the second user, respectively, to change one or more of a location or orientation of their respective camera device to optimize a representation of the live event, wherein the method includes automatically defining the differentiated prompt messages in dependence respective locations of the first and second camera devices.

19. A computer implemented method comprising:
determining a location of interest, the location of interest being a location of a live event; obtaining image data, wherein the obtaining includes obtaining for display crowdsourced image data from a plurality of users located about the location of interest, wherein crowdsourced image data includes image data representing the live event, wherein the obtaining includes automatically prioritizing views from respective camera devices of the plurality of users, wherein the automatically prioritizing is in dependence on a proximity of the camera devices to the live event; and displaying data of the crowdsourced image data representing the live event.

20. The computer implemented method of claim 19, wherein the automatically prioritizing views results in an occurrence of each of (a) image data of a prioritized view transitioning from an undisplayed state to a displayed state, (b) image data from a higher priority view being displayed in a larger size than a lower priority view, and (c) image data of a higher priority view being displayed with an indicator indicating a higher priority.

21. The computer implemented method of claim 19, wherein the automatically prioritizing views results in an occurrence of image data of a prioritized view transitioning from an undisplayed state to a displayed state.

22. The computer implemented method of claim 19, wherein the automatically prioritizing views results in an occurrence of image data from a higher priority view being displayed in a larger size than a lower priority view.

23. A computer implemented method comprising:
determining a location of interest, the location of interest being a location of a live event; obtaining image data, wherein the obtaining includes obtaining for display crowdsourced image data from a plurality of users located about the location of interest, wherein crowdsourced image data includes image data representing the live event, wherein the obtaining includes prioritizing views from respective camera devices of the plurality of users, wherein the prioritizing is in dependence on a history of usage of users of the camera devices during the live event; and displaying data of the crowdsourced image data representing the live event.

24. The computer implemented method of claim 23, wherein the history of usage of users of the camera devices during the live event on which the prioritizing depends includes responsiveness of the users of the camera devices to prompt messages sent to the users during the live event.

25. A computer implemented method comprising:
determining a location of interest, the location of interest being a location of a live event; obtaining image data, wherein the obtaining includes obtaining for display crowdsourced image data from a plurality of users located about the location of interest, wherein crowdsourced image data includes image data representing the live event, wherein the obtaining includes prioritizing views from respective camera devices of the plurality of users, wherein the obtaining includes establishing a geofence to define a determined geofence and identifying camera devices within the geofence, wherein the establishing a geofence is based on one or more current operator input of an operator entered into a user interface of a manager system, wherein the establishing is performed so that the manager system defines X, Y and Z boundaries of the geofence based on one or more input of the operator into a user interface of the manager system; and
displaying data of the crowdsourced image data representing the live event.

* * * * *